United States Patent [19]

Mark

[11] Patent Number: 4,487,917

[45] Date of Patent: Dec. 11, 1984

[54] COPOLYESTER-CARBONATE RESINS EXHIBITING IMPROVED PROCESSABILITY

[75] Inventor: Victor Mark, Evansville, Ind.

[73] Assignee: General Electric Company, Mt. Vernon, Ind.

[21] Appl. No.: 563,762

[22] Filed: Dec. 21, 1983

[51] Int. Cl.³ .............................................. C08G 63/64
[52] U.S. Cl. .................................... 528/196; 528/125; 528/126; 528/128; 528/173; 528/176; 528/190; 528/191; 528/193; 528/195; 528/201; 528/202; 528/204
[58] Field of Search ............... 528/125, 126, 128, 173, 528/176, 193, 191, 190, 195, 196, 201, 202, 204

[56] References Cited

U.S. PATENT DOCUMENTS

| | | | |
|---|---|---|---|
| 3,030,335 | 4/1962 | Goldberg | 528/196 |
| 3,207,814 | 9/1965 | Goldberg | 525/439 |
| 3,493,534 | 2/1970 | Coury et al. | 528/196 |
| 4,107,143 | 8/1978 | Inata et al. | 528/193 |
| 4,381,358 | 4/1983 | Rosenquist | 528/193 |

Primary Examiner—Lester L. Lee
Attorney, Agent, or Firm—Myron B. Kapustij; Martin B. Barancik

[57] ABSTRACT

Thermoplastic aromatic copolyester-carbonate resin exhibiting improved processability derived from:
(i) at least one monoester-diol which is the coreaction product of (a) at least one aromatic hydroxy carboxylic acid or an ester forming reactive derivative thereof, and (b) at least one diol selected from aliphatic diols, aliphatic ether diols, and aromatic diols;
(ii) at least one dihydric phenol; and
(iii) a carbonyl halide carbonate precursor.

31 Claims, No Drawings

COPOLYESTER-CARBONATE RESINS EXHIBITING IMPROVED PROCESSABILITY

BACKGROUND OF THE INVENTION

Copolyester-carbonate resins are members of the tough thermoplastic family of resins which, due to their many advantageous physical and mechanical properties, are finding increasing use as thermoplastic engineering materials. These copolyester-carbonate resins exhibit, for example, excellent properties of toughness, flexibility, impact strength, optical clarity, and good heat distortion temperatures. The conventional copolyester-carbonates may be prepared, for example, by the reaction of a dihydric phenol, a dicarboxylic acid or a reactive derivative thereof, and a carbonate precusor such as phosgene. These conventional copolyester-carbonates as well as methods for their preparation are disclosed inter alia in U.S. Pat. No. 3,169,121.

Unfortunately, however, these copolyester-carbonate resins are rather difficult to process. It would, therefore, be highly desirable to provide a copolyester-carbonate resin which is generally similar in many respects to conventional copolyester-carbonate resins and which also exhibits improved processability.

It is, therefore, an object of the instant invention to provide copolyester-carbonate resins exhibiting improved processability.

SUMMARY OF THE INVENTION

The instant invention is directed to copolyester-carbonate resins exhibiting improved processability which are derived from:

(i) at least one monoester-diol which is the coreaction product of (a) at least one aromatic hydroxy carboxylic acid or a ester forming reactive derivative thereof, and (b) at least one diol;
(ii) at least one dihydric phenol; and
(iii) a carbonyl halide carbonate precusor.

DESCRIPTION OF THE INVENTION

The instant invention is directed to thermoplastic aromatic copolyester-carbonate resins generally exhibiting, to a substantial degree, substantially most of the advantageous properties of conventional copolyester-carbonates and also exhibiting improved processability.

Briefly stated, the copolyester-carbonates of the present invention are comprised of recurring carbonate groups

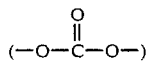

carboxylate groups

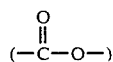

and aromatic carbocyclic groups in the polymer chain in which at least some of the carbonate groups and at least some of the carboxylate groups are bonded directly to the ring carbon atoms of the aromatic carbocyclic groups.

The copolyester-carbonates of the instant invention are comprised of recurring structural units represented by the general formulae

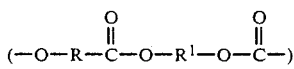

and

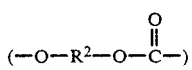

wherein:
R is selected from divalent aromatic radicals;
$R^1$ is selected from divalent aliphatic hydrocarbon radicals, divalent aliphatic ether residues, and divalent aromatic radicals; and
$R^2$ is selected from divalent residues of dihydric phenols.

R in formula I is a divalent aromatic radical, preferably one represented by the general formula

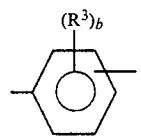

wherein:
$R^3$ is independently selected from monovalent hydrocarbon radicals and halogen radicals; and
b is a positive integer having a value of from 0 to 4 inclusive.

The monovalent hydrocarbon radicals represented by $R^3$ are preferably selected from alkyl and cycloalkyl radicals. The preferred alkyl radicals are those containing from 1 to about 10 carbon atoms. These alkyl radicals include the straight chain alkyl radicals and the branched alkyl radicals. Some illustrative non-limiting examples of these alkyl radicals include methyl, ethyl, propyl, isopropyl, butyl, pentyl, neopentyl, and hexyl. The preferred cycloalkyl radicals are those containing from 4 to about 7 ring carbon atoms. Some illustrative non-limiting examples of these cycloalkyl radicals include cyclobutyl, cyclopentyl, cyclohexyl, methylcyclohexyl, and cycloheptyl.

The preferred halogen radicals represented by $R^3$ are chlorine and bromine.

When more than one $R^3$ substituent is present they may be the same or different.

$R^1$ in Formula I is selected from divalent aliphatic hydrocarbon radicals, divalent aliphatic ether residues, and divalent aromatic radicals.

The divalent aliphatic hydrocarbon radicals represented by $R^1$ include the alkylene radicals, the alkylidene radicals, the cycloalkylene radicals, and the cycloalkylidene radicals. The preferred divalent aliphatic hydrocarbon radicals are the alkylene radicals and the cycloalkylene radicals.

The preferred alkylene radicals are those containing from 1 to about 20 carbon atoms. These alkylene radicals include the straight chain alkylene radicals and the branched alkylene radicals. The preferred cycloalkylene radicals are those containing from 4 to about 7 ring carbon atoms.

The divalent aliphatic ether residues represented by $R^1$ may be represented by the general formula

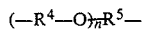

wherein:

$R^4$ is selected from alkylene and cycloalkylene radicals;

$R^5$ is selected from alkylene and cycloalkylene radicals; and n is a positive integer having a value of from 1 to about 10.

Preferred alkylene radicals represented by $R^4$ and $R^5$ are those containing from 1 to about 20 carbon atoms. These alkylene radicals include the straight chain alkylene radicals and the branched alkylene radicals. The preferred cycloalkylene radicals represented by $R^4$ and $R^5$ are those containing from 4 to about 7 ring carbon atoms.

Some illustrative non-limiting examples of the divalent aliphatic hydrocarbon radicals and the divalent aliphatic ether residues represented by $R^1$ include:

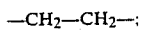

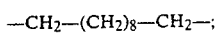

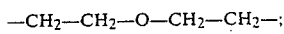

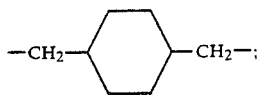

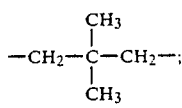

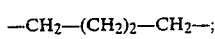

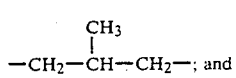

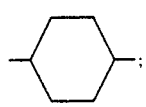

The divalent aromatic radicals represented by $R^1$ may be represented by the general formula

wherein $R^6$ is independently selected from monovalent hydrocarbon radicals and halogen radicals; Ar is a divalent aromatic radical; and q is a positive intgeger having a value from and including zero up to the number of replaceable hydrogen atoms present on Ar. The monovalent hydrocarbon radicals represented by $R^6$ include the alkyl radicals, the aryl radicals, the cycloalkyl radicals, and the aralkyl and alkaryl radicals. The preferred alkyl radicals are those containing from 1 to about 10 carbon atoms. The preferred cycloalkyl radicals are those containing from 4 to about 7 ring carbon atoms. The preferred aryl radicals are those containing from 6 to 12 carbon atoms. The preferred aralkyl and alkaryl radicals are those containing from 7 to about 14 carbon atoms.

The preferred halogen radicals represented by $R^6$ are chlorine and bromine.

Ar includes those arylene radicals containing from 6 to 12 carbon atoms and includes phenylene, naphthylene, and biphenylene.

Ar also includes two phenylene radicals joined by an intervening alkylene or other bridging group. That is to say, $R^1$ may also be a divalent aromatic radical represented by the general formula

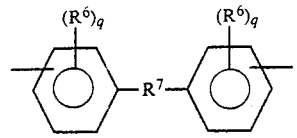

wherein $R^6$ and q are as defined hereinafore; and $R^8$ is selected from alkylene, cycloalkylene, alkylidene, cycloalkylidene, —O—, —S—, —S—S—,

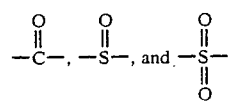

radicals.

Preferred alkylene radicals represented by $R^7$ are those containing from 2 to about 10 carbon atoms. These alkylene radicals include the straight chain and branched alkylene radicals. Preferred alkylidene radicals are those containing from 1 to about 10 carbon atoms. These alkylidene radicals include the straight chain alkylidene radicals and the branched alkylidene radicals. The preferred cycloalkylene and cycloalkylidene radicals are those containing from 4 to about 7 ring carbon atoms.

Preferably $R^1$ in Formula I is selected from divalent aliphatic hydrocarbon radicals and divalent aliphatic ether residues.

$R^2$ in Formula II is selected from the divalent residues of dihydric phenols. The preferred divalent residues of dihydric phenols are represented by the general formula

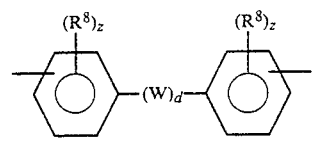

wherein:

W is selected from divalent hydrocarbon radicals; —O—, —S—, —S—S—,

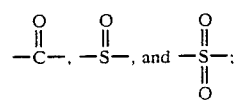

$R^8$ is independently selected from monovalent hydrocarbon radicals and halogen radicals;

z is independently selected from positive integers having a value of from 0 to 4 inclusive; and d is either zero or one.

The divalent hydrocarbon radicals represented by W are preferably selected from alkylene radicals, alkylidene radicals, cycloalkylene radicals, and cycloalkylidene radicals. The preferred alkylene radicals are those containing from 2 to about 10 carbon atoms. These alkylene radicals include the straight chain and branched alkylene radicals. The preferred alkylidene radicals are those containing from 1 to about 10 carbon atoms. These alkylidene radicals include the straight chain as well as the branched alkylidene radicals. The preferred cycloalkylene and cycloalkylidene radicals are those containing from 4 to about 7 ring carbon atoms.

The monovalent hydrocarbon radicals represented by $R^8$ include the alkyl radicals, the cycloalkyl radicals, the aryl radicals, the aralkyl radicals and the alkaryl radicals. The preferred alkyl radicals are those containing from 1 to about 10 carbon atoms. The preferred cycloalkyl radicals are those containing from 4 to about 7 ring carbon atoms. The preferred aryl radicals are those containing from 6 to 12 ring carbon atoms. These preferred aryl radicals include phenyl, naphthyl and biphenyl. The preferred aralkyl and alkaryl radicals are those containing from 7 to about 14 carbon atoms.

The preferred halogen radicals represented by $R^8$ are chlorine and bromine.

When more than one $R^8$ substituent is present they may be the same or different.

The copolyester-carbonate resins of the instant invention are prepared by reacting:

(i) at least one monoester-diol which is the coreaction product of (a) at least one aromatic hydroxy carboxylic acid or an ester forming reactive derivative thereof, and (b) at least one diol selected from aliphatic diols, aliphatic ether diols, and aromatic diols;

(ii) at least one dihydric phenol; and (iii) a carbonyl halide carbonate precursor.

The aromatic hydroxy carboxylic acids reactants utilized in the formation of the monoester-diol may be represented by the general formula

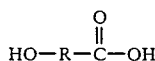

III.

wherein R is as defined hereinafore. More particularly, the aromatic hydroxy carboxylic acids may be represented by the general formula

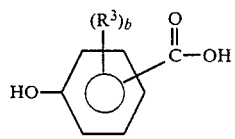

IIIa.

wherein $R^3$ and b are as defined hereinafore.

Some illustrative non-limiting examples of these aromatic hydroxy carboxylic acids include p-hydroxy-benzoic acid, m-hydroxybenzoic acid, 3-hydroxy-5-chlorobenzoic acid, 3-chloro-4-hydroxybenzoic acid, 3-hydroxy-5-methylbenzoic acid, and 3-ethyl-4-hydroxybenzoic acid.

It is possible, and sometimes even preferred, to utilize an ester forming reactive derivative of these aromatic hydroxy benzoic acids rather than the acids themselves. These ester forming reactive derivatives of the aromatic hydroxy carboxylic acids may be represented by the general formula

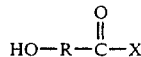

IV.

wherein R is as defined above; and X includes halogen radicals, preferably chlorine and bromine, and the $-OR^{10}$ radical wherein $R^{10}$ represents a monovalent hydrocarbon radical. The monovalent hydrocarbon radicals represented by $R^{10}$ include alkyl radicals, preferably those containing from 1 to about 10 carbon atoms, cycloalkyl radicals, preferably those containing from 4 to about 7 ring carbon atoms, aryl radicals, preferably those containing from 6 to 12 carbon atoms, and aralkyl and alkaryl radicals, preferably those containing from 7 to about 14 carbon atoms.

More particularly, the ester forming reactive derivatives of the aromatic hydroxy carboxylic acids may be represented by the general formula

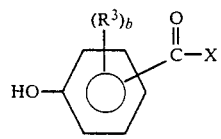

IVa.

wherein $R^3$, b and X are as defined hereinafore.

It is, of course, possible to utilize mixtures of two or more different aromatic hydroxy carboxylic acids or their ester forming reactive derivatives as well as individual acids or their reactive derivatives in the production of the mono-ester diols of the instant invention.

The aliphatic, aliphatic ether, and aromatic diol coreactants used in the preparation of the monoester-diols of this invention may be represented by the general formula $$HO-R^1-OH \quad V.$$

wherein $R^1$ is as defined hereinafore.

The aliphatic diols may be represented by the general formula $$HO-R^{11}-OH \quad Va.$$

wherein $R^{11}$ represents an alkylene radical, a cycloalkylene radical, an alkylidene radical, or a cycloalkylidene radical. Preferably $R^{11}$ represents an alkylene radical or a cycloalkylene radical of the type described hereinafore.

The aliphatic ether diols may be represented by the general formula $$HO-R^4-O)_{\overline{n}}R^5-OH \quad Vb.$$

wherein $R^4$, $R^5$, and n are as defined hereinafore.

Some illustrative non-limiting examples of the aliphatic diols and the aliphatic ether diols include:

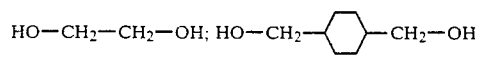

$HO-CH_2(CH_2)_2CH_2-OH$;

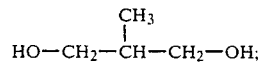

$HO-CH_2(CH_2)_8CH_2-OH$;

-continued

HO—CH₂CH₂—O—CH₂CH₂—OH;

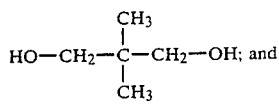

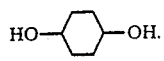

The aromatic diols may be represented by the general formula

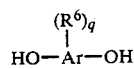
Vc.

where $R^6$, Ar, and q are as defined hereinafore.

Some illustrative non-limiting examples of the aromatic diols include:

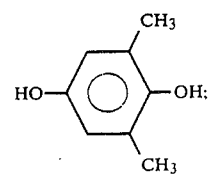

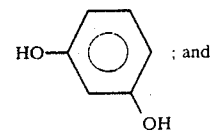
; and

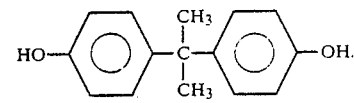

The preferred diols of Formula V are the aliphatic diols and the aliphatic ether diols.

It is, of course, possible to utilize a mixture of two or more different diols as well as individual diols in the preparation of the monoester-diols of the instant invention.

In the preparation of the copolyester-carbonates of the instant invention the aromatic hydroxy carboxylic acid is first coreacted with the diol to form a monoester-diol represented by the general formula

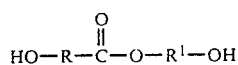
VI.

wherein R and $R^1$ are as defined hereinafore. More particularly, the monoester-diol of Formula VI may be represented by the general formula

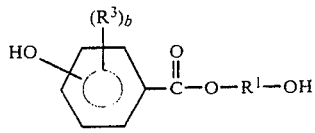
VIa.

wherein $R^3$, $R^1$, and b are as defined hereinafrore.

In the preparation of these monoester-diols one mole of the aromatic hydroxy carboxylic acid or its ester forming reactive derivative is reacted with one mole of the diol. While theoretically it takes the reaction of one mole of the acid or its reactive derivative with one mole of the diol to form the monoester-diol, practically it is generally preferred to utilize an excess of the diol coreactant.

In the preparation of the monoester-diols of the instant invention if the aromatic hydroxy carboxylic acid itself is reacted with the diol the reaction is carried out under substantially anhydrous conditions. If the acid itself or its ester derivative, i.e., where X is —OR¹⁰, is utilized the reaction is carried out in the presence of an esterification-transesterification catalyst. Such catalysts are well known in the art and include the protic acids and the Lewis acids. Some useful Lewis acid catalysts are disclosed in U.S. Pat. No. 4,045,464, which is hereby incorporated by reference. If the acid halide is used, i.e., where X is a halogen radical, the reaction of the acid halide with the diol is preferably carried out in the presence of an acid acceptor. These acid acceptors are well known in the art and include the organic basis such as pyridine, triethylamine, and the like, and the inorganic bases such as sodium hydroxide, calcium hydroxide, and the like.

In order to avoid or keep to a minimum the formation of byproducts other than the desired monoester-diol during the reaction of the acid or its ester-forming reactive derivative with the diol the reaction conditions and/or the reactants may be selected so that the monoester-diol is the predominant product. Thus, for example, if an aromatic diol such as bisphenol-A is utilized it may be reacted with a phenyl ester of the aromatic hydroxy carboxylic acid in the presence of a transeterification catalyst and the phenol byproduct may be removed by distillation. If an aliphatic diol is used the reaction of the acid with itself to form the ester of the aromatic hydroxy acid is generally negligible as the predominant reaction product is that of the acid with the aliphatic diol, i.e., the monoester-diol.

The dihydric phenol reactants may be represented by the general formula

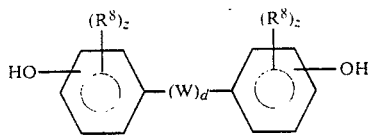
VII wherein $R^8$, W, z and d are as defined hereinafore.

Some illustrative non-limiting examples of these dihydric phenols include:
2,2-bis(4-hydroxyphenyl)propane (bisphenol-A);
2,2-bis(3,5-dimethyl-4-hydroxyphenyl)propane;

2,2-bis(3-chloro-4-hydroxyphenyl)propane;
bis(4-hydroxyphenyl)methane;
1,1-bis(4-hydroxyphenyl)cyclohexane;
1,1-bis(4-hydroxyphenyl)ethane;
4,4'-thiodiphenol;
1,3-bis(4-hydroxyphenyl)propane;
3,3-bis(4-hydroxyphenyl)pentane;
2,2-bis(3-chloro-5-methyl-4-hydroxyphenyl)propane; and
2,2-bis(3,5-dibromo-4-hydroxyphenyl)propane.

In order to produce the copolyester-carbonate resins of the instant invention the monoester-diol, the dihydric phenol, and the carbonyl halide carbonate precursor are reacted under conditions effective to form the copolyester-carbonates containing repeating structural units of Formulae I and II.

The copolyester-carbonates may be formed by the use of any of the well known copolyester-carbonate producing reactions or processes. In the production of the instant copolyester-carbonates, depending upon the process utilized, either the monoester-diol itself or its monohaloformate may be used as one of the reactants. The monohaloformates of the mooester-diol may be represented by the general formula

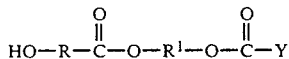

wherein R and $R^1$ are as defined hereinafore, and Y represents a halogen radical, preferably chlorine or bromine. These monohaloformates of the monoester-diols may be conveniently prepared by the reaction of one mole of a carbonyl halide carbonate precursor such as phosgene with one mole of the monoester-diol.

If the monoester-diol itself is utilized as one of the reactants in the preparation of the instant copolyester-carbonates then an organic base solvent process such as the pyridine or triethylamine/methylene chloride process is used. These organic base solvent process are well known in the art and include the pyridine process for the production of copolyester-carbonate resins which is described inter alia in U.S. Pat. No. 3,030,335.

If the monohaloformate of the monoester-diol is used as one of the reactants in the production of the instant copolyester-carbonate resins then an interfacial polymerization process for the preparation of the copolyester-carbonate resins may be used. The interfacial polymerization process for the preparation of copolyester-carbonates is well known in the art and is described, for example, in U.S. Pat. No. 3,169,121.

The relative amounts of the structural units of Formulae I and II present in the instant copolyester-carbonates will depend upon the relative amounts of the monoester-diol, or its monohaloformate, and the dihydric phenol employed. Thus, for example, the more monoester-diol or its monohaloformate employed the larger the amount of the recurring structural units of Formula I present in the copolyester-carbonate. The larger the amount of the dihydric phenol employed, the greater the amount of recurring structural units of Formula II present in the copolyester-carbonate.

The amount of the monoester-diol or its monohaloformate employed is a processability improving amount. By processability improving amount is meant an amount effective to improve the processability of the copolyester-carbonate resins but insufficient to adversely affect, to a substantial degree, substantially most of the other advantageous properties of the copolyester-carbonate resins. In general, this amount is from about 1 to about 45 mole percent, based on the amount of dihydric phenol employed, and preferably from about 2 to about 25 mole percent, based on the amount of dihydric phenol employed.

One method of preparing the copolyester-carbonate resins of the instant invention from the monohaloformate of the monoester-diol, the dihydric phenol, and the carbonyl halide carbonate precursor such as phosgene involves the heterogeneous interfacial polymerization process. In this method two immiscible solvent systems are utilized, one being an aqueous solvent system and the other being a water immiscible organic solvent system such as methylene chloride. The dihydric phenol is dissolved in the aqueous system, such as an alkaline aqueous solvent system. The addition of the carbonyl halide carbonate precursor is carried out under basic conditions by preferably utilizing an aqueous caustic solution to maintain the pH in the basic range. Also present in the reaction mixture are a catalyst and a molecular weight regulator.

The catalysts which may be employed are any of the well known catalysts that accelerate or promote the copolyester-carbonate forming reaction. Suitable catalysts include, but are not limited to, tertiary amines such as triethylamine, quaternary ammonium compounds, and quaternary phosphonium compounds.

The molecular weight regulators employed may be any of the well known compounds that regulate the molecular weight of the copolyester-carbonate resins by a chain terminating mechanism. These compounds include, but are not limited to, phenol, p-tertiary-butyl phenol, and Chroman-I.

The temperature at which the phosgenation reaction proceeds in the interfacial polymerization process may vary from below 0° C. to above 100° C. The reaction proceeds satisfactorily at temperatures from room temperature (25° C.) to about 50° C.

The instant copolyester-carbonates generally have a weight average molecular weight in the range of from about 10,000 to about 150,000, and preferably from about 15,000 to about 100,000.

The copolyester-carbonate resin of this invention may also optionally have admixed therewith certain commonly known and used additives such as inert fillers such as glass, talc, mica, and clay; impact modifers; ultraviolet radiation absorbers such as the benzophenones and benzotriazoles; hydrolytic stabilizers such as the epoxides disclosed in U.S. Pat. Nos. 3,489,716; 4,138,379 and 3,839,247, all of which are incorporated herein by reference; color stabilizers such as the organophosphites; and flame retardants.

Some particularly useful flame retardants are the alkali and alkaline earth metal salts of sulfonic acids. These types of flame retardants are disclosed in U.S. Pat. Nos. 3,933,734, 3,948,851, 3,926,908, 3,919,167, 3,909,490, 3,953,396, 3,931,100, 3,978,024, 3,953,399, 3,951,910 and 3,940,366, all of which are incorporated herein by reference.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and precentages are on a weight basis, unless otherwise indicated.

The following example illustrates the preparation of the monoester-diol of the instant invention.

EXAMPLE 1

This example illustrates the preparation of 4-hydroxybutyl p-hydroxybenzoate.

A reaction mixture containing 45.6 grams (0.3 mole) of methyl p-hydroxybenzoate, 270 grams (3 moles) of 1,4-butanediol and 0.31 gram of tetrakis(2-ethyl-hexyl) titanate was heated, with stirring, at 170° C. for period of about 5 hours. During the heating period the liberated methanol, produced by the ester exchange reaction, is removed by distillation at atmospheric pressure. After the methanol is removed, vacuum is applied to the reaction flask and the excess 1,4-butanediol is also removed. The distillation residue is dissolved in ether, the resultant solution is washed with water, filtered and the ether evaporated. The residue is briefly triturated with small amounts of methylene chloride in an automatic blender, filtered, dried and subjected to analysis by gas chromatography. The resultant pure white solids melt at 91°–93° C. and are shown by gas chromatography to be about 99% pure; gc elution time: 16.81 minutes relative to 14.00 minutes for p-cumylphenol, which is used as a reference.

The following example illustrates the preparation of a monohaloformate of the monester-diols of the instant invention.

EXAMPLE 2

This example illustrates the preparation of the chloroformate of 4-hydroxybutyl p-hydroxybenzoate Into a solution of 87.0 grams (0.44 mole) of the 4-hydroxybutyl p-benzoate prepared substantially in accordance with the procedure of Example 1 in 500 milliliters of methylene chloride there are introduced 48 grams of phosgene while with external ice cooling the temperature of the reaction mixture is maintained between 3° and 10° C. After completion of the phosgene addition the reaction mixture is allowed to gradually warm up to ambient temperature, at which point the excess phosgene is removed by nitrogen purge. The solids present are filtered and the methylene chloride solution is stripped off with aspirator vacuum at ambient temperature leaving the chloroformate as the residue. This residue weights 73.1 grams, which represents 61% of theoretical yield. Infrared analysis confirms the presence of the chloroformate group by a strong absorbtion at 1780 cm$^{-1}$, as well as the presence of the ester carbonyl stretching frequency at 1695 cm$^{-1}$.

The following example illustrates the preparation of a conventional copolyester-carbonate resin falling outside the scope of the instant invention. This example is presented for comparative purposes only.

EXAMPLE 3

To a reactor vessel fitted with a mechanical agitator are charged 10 liters of deionized water, 16 liters of methylene chloride, 1,910 grams (8.36 moles) of bisphenol-A, 24 milliliters of triethylamine, 3.4 grams of sodium gluconate, and 65 grams of paratertiarybutyl phenol. This reaction mixture is stirred and to the stirred mixture are added over a 15 minute period 926 grams of terephthaloyl dichloride and 163 grams of isophthaloyl dichloride as a 25 weight percent solids solution in methylene chloride. During the acid chloride addition the pH is maintained in the range of 8.5–11.5 by the addition of 25% aqueous sodium hydroxide solution. The resulting mixture is phosgenated by the introduction of phosgene at the rate of 36 grams per minute for 15 minutes with the pH controlled at 9.5 to 12 by the addition of the aqueous sodium hydroxide solution. After phosgenation is terminated, 6 liters of methylene chloride are added, the brine layer is separated by centrifuge and the resin is washed with dilute aqueous HCl and three times with water. The resin is steam precipitated and dried in a nitrogen fluid bed drier at approximately 240° C.

The Kasha Index (KI) of the resin is determined and the results are set forth in Table I.

The Kasha Index is an indication or measure of the processability of the resin. The lower the Kasha Index the greater the melt flow of the resin and, consequently, the better the processability of the resin. Basically, the Kash Index is a measurement of the melt viscosity of the resin. The procedure for determining the Kasha Index is as follows: 7 grams of resin pellets, dried a minimum of 90 minutes at 125° C. are added to as modified Tinius-Olsen T3 melt indexer; the temperature in the indexer is maintained at 300° C. and the resin is heated at this temperature for 6 minutes; after 6 minutes the resin is forced through a 1.05 mm radius orifice using a plunger of radius 4.7 mm and an applied force of 7.7 kgs; the time required for the plunger to travel 5.1 cm is measured in centiseconds and this is reported as the Kasha Index (KI). The higher the KI the higher the melt viscosity of the resin and the more viscous the resin and, therefore, the more difficult to process.

The following example illustrates the preparation of a conventional polycarbonate resin falling outside the scope of the instant invention. This example is presented for comparative purposes only.

EXAMPLE 4

Into a mixture of 57.1 grams (0.25 mole) of bisphenol-A, 300 milliliters of water, 400 milliliters of methylene chloride, 0.6 gram of phenol, and 0.56 gram of triethylamine are introduced, at ambient temperature, 31 grams of phosgene over a period of 31 minutes while maintaining the pH of the two phase system at about 11 by the simultaneous addition of a 25% aqueous solution of sodium hydroxide. At the end of the phosgene addition period the pH of the aqueous phase is 11.7 and the bisphenol-A content of this phase is less than 1 part per million as demonstrated by ultraviolet analysis.

The methylene chloride phase is separated from the aqueous phase, washed with an excess of dilute (0.01N) HCl and then washed three times with deionized water. The polymer is precipitated with methanol and dried at 80° C. The resultant polymer has an I.V. in methylene chloride at 25° C. of 0.622 and a glass transition temperature of 149° C.

The KI of the polycarbonate resin is determined and the results are set forth in Table I.

The following example illustrates the preparation of the copolyester-carbonate resin of the instant invention.

EXAMPLE 5

Into a mixture of 22.8 grams (0.1 mole) of bisphenol-A, 0.1 gram of phenol, 0.2 gram of triethylamine, 300 milliliters of water, 400 milliliters of methylene chloride there are added, dropwise, at a pH of 11, 2.4 grams (0.01 mole) of the monochloroformate of 4-hydroxybutyl p-hydroxybenzoate prepared substantially in accordance with the procedure of Example 2. After the addition of the monochloroformate is completed phosgene is introduced at the rate of 0.5 gram per minute for a period of 20 minutes while maintaining the pH at about 11 by the simultaneous addition of 25% aqueous sodium hydroxide solution. At the end of the phosgene addition period the pH of the aqueous phase is 11.7.

The methylene chloride phase is separated from the aqueous phase, washed with an excess of dilute (0.01N) aqueous HCl and then washed three times with deionized water. The polymer is precipitated with methanol and dried at 80° C. The resultant polymer has an I.V. in methylene chloride at 25° C. of 0.23 dl/gm and a glass transition temperature of 131° C.

The KI of this polymer is determined and the results are set forth in Table I.

TABLE I

| Example No. | KI |
|---|---|
| 3 | 42,630 |
| 4 | 9,240 |
| 5 | 1,550 |

As illustrated by the data in Table I the copolyester-carbonate resins of the instant invention exhibit a lower KI than conventional copolyester-carbonates (Example 3). Furthermore, not only do the instant copolyester-carbonates exhibit a lower KI than conventional copolyester-carbonates, but they also exhibit a lower KI than conventional polycarbonates (Example 4). Thus, not only do the instant copolyester-carbonates exhibit improved processability as compared with conventional copolyester-carbonate resins, but they also exhibit improved processability as compared with conventional polycarbonates. Since, generally, polycarbonates exhibit better processability than copolyester-carbonates, this improved processability vis-a-vis conventional polycarbonates is unusual and unexpected.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. Thermoplastic aromatic copolyester-carbonate resin exhibiting improved processability containing recurring structural units represented by the general formulae:

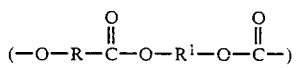

and

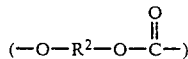

wherein:
R is independently selected from divalent aromatic radicals;
$R^1$ is selected from divalent aliphatic hydrocarbon radicals, divalent aliphatic ether residues represented by the general formula $(-R^4-O-)_nR^5-$ where $R^4$ is selected from alkylene radicals and cycloalkylene radicals, $R^5$ is selected from alkylene radicals and cycloalkylene radicals, and n is a positive integer having a value of from 1 to about 10, and divalent aromatic radicals; and
$R^2$ is selected from divalent residues of dihydric phenols represented by the general formula

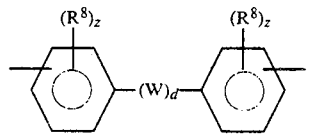

wherein
W is selected from divalent hydrocarbon radicals, —O—, —S—, —S—S—,

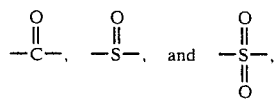

$R^8$ is independently selected from monovalent hydrocarbon radicals and halogen radicals,
z is independently selected from positive integers having a value of from 0 to 4 inclusive, and
d is either zero or one.

2. The resin of claim 1 wherein said divalent aromatic radicals represented by R are selected from radicals represented by the general formula

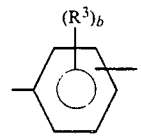

wherein:
$R^3$ is independently selected from monovalent hydrocarbon radicals and halogen radicals;
b is a positive integer having a value of from 0 to 4 inclusive.

3. The resin of claim 2 wherein said monovalent hydrocarbon radicals represented by $R^3$ are selected from alkyl radicals and cycloalkyl radicals.

4. The resin of claim 2 wherein said halogen radicals represented by $R^3$ are selected from chlorine and bromine.

5. The resin of claim 2 wherein said divalent hydrocarbon radicals represented by $R^1$ are selected from alkylene radicals and cycloalkylene radicals.

6. The resin of claim 2 wherein said divalent aromatic radicals represented by $R^1$ are represented by the general formula

wherein:
$R^6$ is independently selected from monovalent hydrocarbon radicals and halogen radicals;
Ar is selected from divalent aromatic radicals; and
q is a positive integer having a value from and including zero up to the number of replaceable hydrogen atoms present on Ar.

7. The resin of claim 6 wherein Ar is selected from phenylene, biphenylene and naphthylene.

8. The resin of claim 7 wherein said monovalent hydrocarbon radicals represented by $R^6$ are selected from alkyl radicals, cycloalkyl radicals, aryl radicals, aralkyl radicals, and alkaryl radicals.

9. The resin of claim 1 wherein said divalent hydrocarbon radicals represented by W are selected from alkylene radicals, cycloalkylene radicals, alkylidene radicals, and cycloalkylidene radicals.

10. The resin of claim 1 wherein said monovalnet hydrocarbon radicals represented by $R^8$ are selected from alkyl radicals, cycloalkyl radicals, aryl radicals, aralkyl radicals, and alkaryl radicals.

11. The resin of claim 1 wherein said halogen radicals represented by $R^8$ are selected from chlorine and bromine.

12. The resin of claim 1 wherein said residue of the dihydric phenol is the residue of bisphenol-A.

13. The resin of claim 12 wherein R is the phenylene radical.

14. The resin of claim 13 wherein said carbonyl halide carbonate precursor is phosgene.

15. The resin of claim 14 wherein $R^1$ is selected from alkylene and cycloalkylene radicals.

16. The resin of claim 14 wherein $R^1$ is selected from the divalent ether residues.

17. Thermoplastic aromatic copolyester-carbonate resin exhibiting improved processability comprising the reaction products of:
   (i) at least one monoester-diol which is the coreaction product of an aromatic hydroxy carboxylic acid or an ester forming reactive derivative thereof and a diol selected from aliphatic diols, aliphatic ether diols, and aromatic diols, or a monohaloformate thereof;
   (ii) at least one dihydric phenol; and
   (iii) a carbonyl halide carbonate precursor.

18. The resin of claim 17 wherein said monoester-diol or its monohaloformate is utilized in a processability improving amount.

19. The resin of claim 18 wherein said processability improving amount is from about 1 to about 45 mole percent, based on the amount of said dihydric phenol present.

20. The resin of claim 19 wherein said processability improving amount is from about 2 to about 25 mole percent, based on the amount of said dihydric phenol present.

21. The resin of claim 17 wherein said diol is selected from aliphatic diols and aliphatic ether diols.

22. The resin of claim 17 wherein the monohaloformate of the monoester-diol is the reaction product of said monoester-diol and a carbonyl halide.

23. The resin of claim 18 wherein said dihydric phenol is represented by the general formula

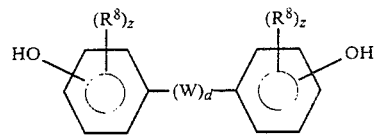

wherein:
W is selected from divalent hydrocarbon radicals, —O—, —S—, —S—S—,

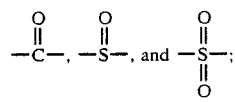

$R^8$ is independently selected from monovalent hydrocarbon radicals and halogen radicals;
z is independently selected from positive integers having a value of from 0 to 4 inclusive; and
d is either zero or one.

24. The resin of claim 23 wherein said divalent hydrocarbon radicals represented by W are selected from alkylene radicals, cycloalkylene radicals, alkylidene radicals, and cycloalkylidene radicals.

25. The resin of claim 23 wherein said monovalent hydrocarbon radicals represented by $R^8$ are selected from alkyl radicals, aryl radicals, cyclaolkyl radicals, aralkyl radicals, and alkaryl radicals.

26. The resin of claim 23 wherein said halogen radicals represented by $R^8$ are selected from chlorine and bromine.

27. The resin of claim 23 wherein said dihydric phenol is bisphenol-A.

28. The resin of claim 27 wherein said carbonyl halide carbonate precursor is phosgene.

29. The resin of claim 28 wherein said monoester-diol is the coreaction product of hydroxy benzoic acid or an ester forming reactive derivative thereof and a diol selected from aliphatic diols and aliphatic ether diols.

30. The resin of claim 28 wherein said monohaloformate of said monoester-diol is the coreation product of said monoester-diol and a carbonyl halide.

31. The resin of claim 30 wherein said carbonyl halide is phosgene.

* * * * *